United States Patent [19]

Hodgson

[11] 4,354,526

[45] Oct. 19, 1982

[54] CONTROL VALVES

[75] Inventor: Robert F. Hodgson, Youngstown, Ohio

[73] Assignee: Commercial Shearing, Inc., Youngstown, Ohio

[21] Appl. No.: 177,387

[22] Filed: Aug. 12, 1980

[51] Int. Cl.³ ............................................. F15B 13/04
[52] U.S. Cl. ................................. 137/625.48; 91/449; 91/452; 137/881; 251/284; 251/297
[58] Field of Search ................................. 91/449, 452; 137/625.48, 881; 251/284, 297

[56] References Cited

U.S. PATENT DOCUMENTS

| | | | |
|---|---|---|---|
| 2,538,928 | 1/1951 | Wood | 91/449 X |
| 2,679,263 | 5/1954 | Kiser et al. | 251/297 X |
| 2,847,182 | 8/1958 | Mancusi | 251/297 X |
| 3,050,083 | 8/1962 | Verway | 251/297 X |
| 3,610,285 | 10/1971 | Passaggio | 251/284 X |
| 3,707,168 | 12/1972 | Boelkins | 137/625.48 |

*Primary Examiner*—Gerald A. Michalsky
*Attorney, Agent, or Firm*—Buell, Blenko, Ziesenheim & Beck

[57] ABSTRACT

A valve structure is provided for use in an integral hydraulic pump and valve assembly having a housing adapted to be integral with a pump housing with spaced apart low pressure and high pressure ports corresponding to the low pressure inlet port and high pressure outlet port of said pump, a low pressure chamber, a high pressure chamber and a cylinder chamber in said housing spaced apart and generally parallel to one another, a transverse bore in said housing intersecting said chambers, valve means movable axially in said bore, said valve means having an annular groove intermediate its ends capable of connecting said low pressure and high pressure chambers in a first neutral position, capable of connecting all of said chambers in a second position and connecting only the low pressure chamber in a third position, detent means in said housings extending into said bore and annular groove in the valve member, detent engaging means in said groove intermediate its ends and stroke limiting means extending into the bore and groove on opposite sides of the detent means to engage the ends of the groove when the valve member is moved in opposite directions to limit its movement.

5 Claims, 5 Drawing Figures

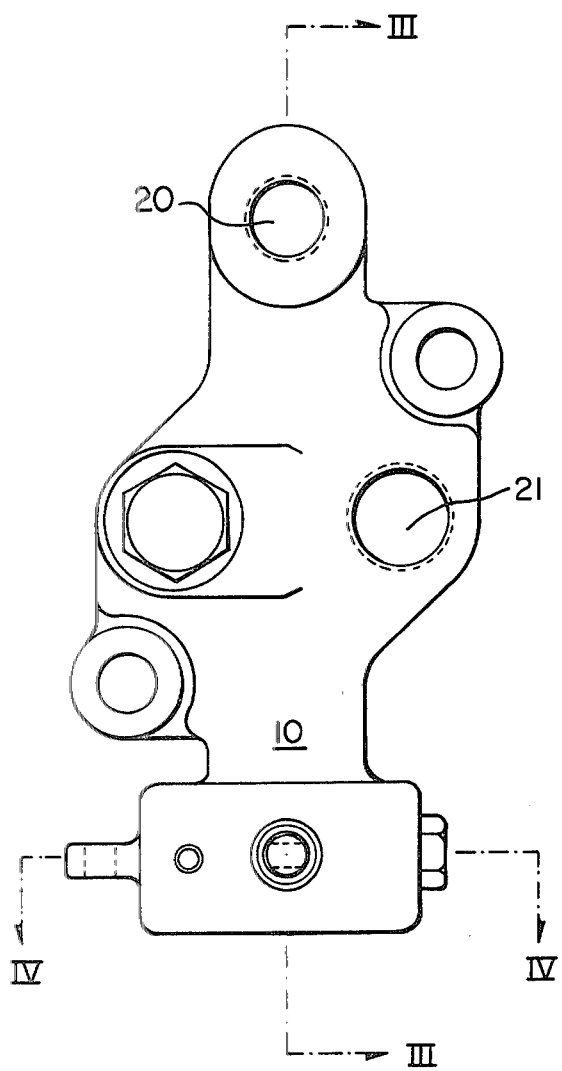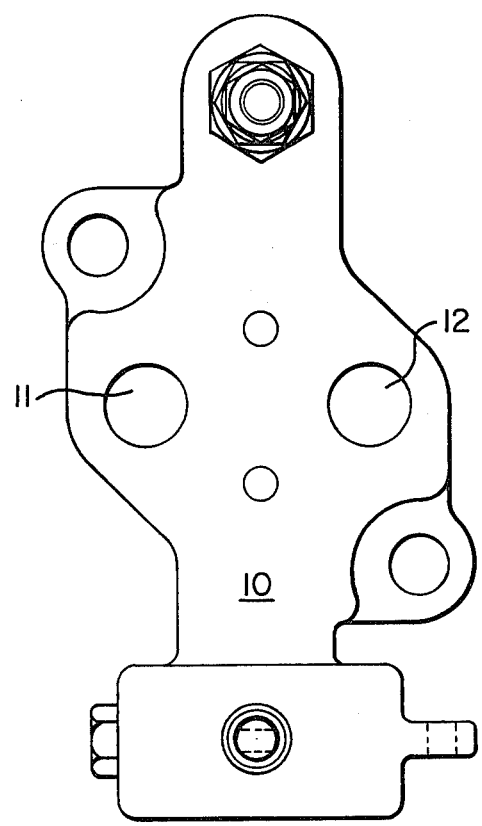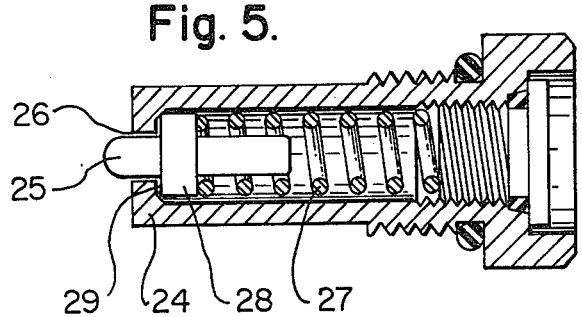

CONTROL VALVES

This invention relates to control valves and particularly to control valves for use in an integral hydraulic pump and valve assembly.

The use of integral hydraulic pump and valve assemblies is not itself new. There are several forms of such assemblies on the market. In one form the valve body circuitry is an integral part of the pump and cover. In another form the valve body circuitry is a separate casting which is attached to the end cover of a pump. Two of the important considerations in such structures are compactness and simplicity. In all such structures it is necessary to have a detent mechanism acting on the valve spool and a stop mechanism for limiting the movement in each direction. It has been conventional in these mechanisms, as in ordinary control valves, to add a detent mechanism on one end of the spool and a stop mechanism such as snap rings and retainer rings on the two ends of the spool outside the spool housing. These expedients necessarily add length to the spool beyond that needed for the primary function of directing the flow of oil. In addition the snap rings and/or retainer rings are externally exposed which increases the potential of a ring coming off which would permit the spool to over-travel.

The present invention provides a structure in which the problem of additional length and exposed stop members is eliminated. In the structure of this invention, the detent engages the spool in a reduced center area of the spool and a cartridge carrying the detent acts as an internal stop in each direction. In addition to eliminating the problems of excess length and exposed stop means mentioned above, the structure of this invention also makes it possible to use a symmetrical spool which can be inserted either way in the valve bore.

The valve structure of this invention comprises a housing adapted to be attached to a pump housing and having a low pressure port and a high pressure port adapted to connect with the inlet and outlet ports of said pump, a low pressure chamber, a high pressure chamber, and a cylinder chamber in said housing spaced from one another and generally parallel thereto, a transverse valve bore in said housing intersecting said chambers against one end, valve means movable axially in said bore, said valve means having an annular groove intermediate its ends capable of connecting said low pressure and high pressure chambers in a first position, said low pressure, high pressure and cylinder chambers in a second position and said low pressure chamber only in a third position, detent means in said housing extending into said bore and annular groove in the valve member, detent engaging means in said groove intermediate its ends and stroke limiting means surrounding said detent means and extending into said bore within the annular groove in said valve member. Preferably the detent means is a spring loaded poppet movable in the stroke limiting means. The stroke limiting means is preferably a hollow cylindrical barrel threaded into said housing and extending into the bore. The valve means is preferably symmetrical about the detent groove therein so that it may be inserted either way in the bore.

In the foregoing general description I have set out certain objects, purposes and advantages of my invention. Other objects, purposes and advantages of this invention will be apparent from a consideration of the following description and the accompanying drawings in which:

FIG. 1 is an end view of a valve structure according to this invention;

FIG. 2 is an end view from the opposite side of the valve of FIG. 1 showing the oil flow connection to a pump;

FIG. 5 is a section through the stroke limiting means.

Figure 3:
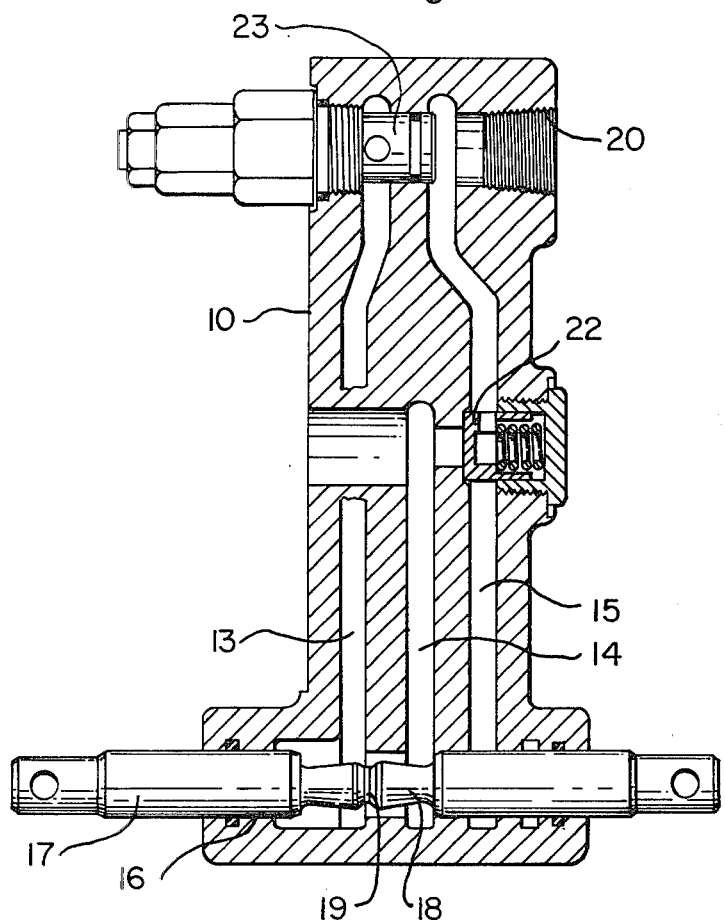
FIG. 3 is a section on the line III—III of FIG. 1.
Figure 4:
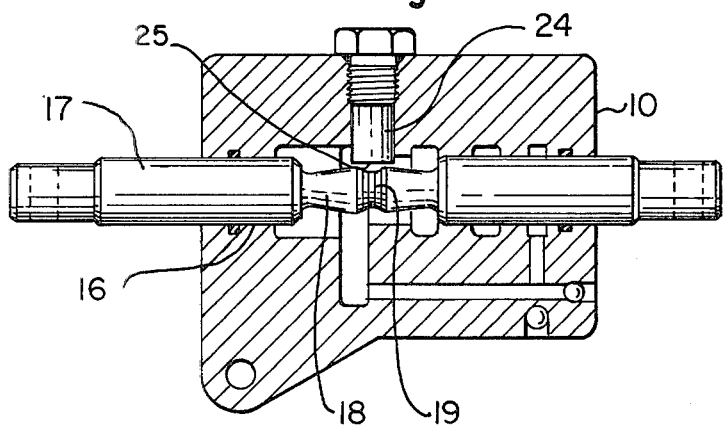
FIG. 4 is a section on the line IV—IV of FIG. 1.

Referring to the drawings I have illustrated a control valve for use in an integral hydraulic pump and valve assembly. In the illustrated structure I provide a housing 10 adapted to be attached to one end of a pump housing and having a low pressure port 11 and a high pressure port 12 spaced apart on one end of the housing to match the low pressure and high pressure ports of a pump. The housing has generally spaced apart side-by-side low pressure chamber 13, high pressure chamber 14 and cylinder chamber 15. A transverse bore 16 extends through the housing from side to side intersecting all of chambers 13, 14 and 15. A valve member 17 having a central groove 18 is slidable in said bore 16. Groove 18 is provided with an annular detent engaging slot 19 midway between its ends. The groove 18 is arranged so that in one position of valve member 17 the low pressure chamber 13 and high pressure chamber 14 are connected through bore 16; in a second position all of chambers 13, 14 and 15 are connected; and in a third position only low pressure chamber 13 is connected. A cylinder port 20 is provided in the end of valve housing 10 opposite the high pressure port 12 and the low pressure port 11. An inlet port 21 is provided in the same end of housing 10 as the cylinder port. A check valve 22 is provided between high pressure chamber 14 and cylinder chamber 15 and a relief valve 23 is provided between cylinder chamber 15 and low pressure chamber 13. A hollow cylindrical barrel stroke limiting means 24 is provided in housing 10 intersecting bore 16 and extending into groove 18 to engage the ends of groove 18 when valve member 17 is moved axially in bore 16 and thus limit the movement of the valve member in said bore. A detent poppet 25 is movable in axial passage 26 in stroke limiting means 24 and is urged to a position extending out of the end of bore 26 by spring 27 acting on annular shoulder 28 on poppet 25, until shoulder 28 bears on stops 29 in stroke limiting means 24. Detent poppet 25 engages detent slot 19 in valve member 17 in the neutral position of the valve member with groove 18 connecting the low pressure chamber 13 and high pressure chamber 14. Thus, the operator has an indicator of neutral position and the valve is held there by the detent poppet 25 resting in the detent slot 19. Movement of the valve member to the second position to the right view of FIG. 3 with groove 18 abutting the stroke limiting means 24 connects all chambers and permits fluid to return from cylinder port 20 back to the low pressure chamber. Movement of the valve member to the third position (to the left viewing FIG. 3 with the opposite end of groove 18 abutting the stroke limiting means 24, closes the bore to all chambers except chamber 13. This causes the high pressure fluid coming from the pump through high pressure port 12 and into high pressure chamber 14 to open check valve 22 and pass into cylinder chamber 15 and out cylinder port 20 to a hydraulic cylinder or other working device.

In the foregoing specification I have set out certain preferred practices and embodiments of my invention, however, it will be understood that this invention may be otherwise practiced within the scope of the following claims.

I claim:

1. A valve structure for use in an integral hydraulic pump and valve assembly comprising a housing adapted to be integral with a pump housing and having spaced apart low pressure and high pressure ports corresponding to the low pressure inlet port and high pressure outlet port of said pump, a low pressure chamber, a high pressure chamber and a cylinder chamber in said housing spaced apart and generally parallel to one another, a transverse bore in said housing intersecting said chambers, valve means movable axially in said bore, said valve means having an annular groove intermediate its ends capable of connecting said low pressure and high pressure chambers in a first neutral position, capable of connecting all of said chambers in a second position and connecting only the low pressure chamber in a third position, detent means in said housing extending into said bore and annular groove in the valve member, detent engaging means in said groove intermediate its ends and stroke limiting means extending into the bore and groove on opposite sides of the detent means to engage the ends of the groove when the valve member is moved in opposite directions to limit its movement.

2. A valve structure as claimed in claim 1 wherein the stroke limiting means is a hollow barrel element surrounding the detent means.

3. A valve structure as claimed in claim 1 or 2 wherein the detent means is a spring loaded poppet movable in a hollow bore in the stroke limiting means.

4. A valve structure as claimed in claim 3 wherein the valve means is symmetrical about the detent engaging means.

5. A valve structure as claimed in claim 1 or 2 wherein the valve means is symmetrical about the detent engaging means.

* * * * *